US011034620B2

(12) United States Patent
Jeong et al.

(10) Patent No.: US 11,034,620 B2
(45) Date of Patent: Jun. 15, 2021

(54) COMPOSITION FOR ARTIFICIAL MARBLE

(71) Applicant: LOTTE CHEMICAL CORPORATION, Seoul (KR)

(72) Inventors: Bong Jae Jeong, Uiwang-si (KR); Chang Ho Son, Uiwang-si (KR); Ju Sung Kim, Uiwang-si (KR); Seung Yong Bae, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 45 days.

(21) Appl. No.: 16/470,317

(22) PCT Filed: Dec. 19, 2017

(86) PCT No.: PCT/KR2017/015028
§ 371 (c)(1),
(2) Date: Jun. 17, 2019

(87) PCT Pub. No.: WO2018/117603
PCT Pub. Date: Jun. 28, 2018

(65) Prior Publication Data
US 2020/0115279 A1 Apr. 16, 2020

(30) Foreign Application Priority Data
Dec. 20, 2016 (KR) .................. 10-2016-0174840
Dec. 19, 2017 (KR) .................. 10-2017-0174922

(51) Int. Cl.
C04B 26/06 (2006.01)
C01G 9/02 (2006.01)
C04B 14/20 (2006.01)
C04B 14/28 (2006.01)
C04B 14/30 (2006.01)
C04B 20/00 (2006.01)
C04B 22/06 (2006.01)
C04B 26/18 (2006.01)
C04B 103/00 (2006.01)
C04B 103/40 (2006.01)
C04B 103/50 (2006.01)
C04B 111/54 (2006.01)
C04B 111/82 (2006.01)
C04B 26/04 (2006.01)

(52) U.S. Cl.
CPC ............... *C04B 26/06* (2013.01); *C01G 9/02* (2013.01); *C04B 14/202* (2013.01); *C04B 14/285* (2013.01); *C04B 14/303* (2013.01); *C04B 20/0076* (2013.01); *C04B 22/066* (2013.01); *C04B 26/18* (2013.01); *C01P 2002/70* (2013.01); *C01P 2004/61* (2013.01); *C01P 2004/62* (2013.01); *C01P 2006/12* (2013.01); *C01P 2006/62* (2013.01); *C01P 2006/63* (2013.01); *C01P 2006/64* (2013.01); *C04B 26/04* (2013.01); *C04B 2103/0062* (2013.01); *C04B 2103/408* (2013.01); *C04B 2103/50* (2013.01); *C04B 2111/545* (2013.01); *C04B 2111/82* (2013.01)

(58) Field of Classification Search
CPC ...................................................... C04B 26/04
See application file for complete search history.

(56) References Cited

U.S. PATENT DOCUMENTS

| 5,916,947 | A | * | 6/1999 | Morris | ................. | C09D 5/1687 |
| | | | | | | 106/18.32 |
| 6,475,631 | B1 | | 11/2002 | Yamamoto et al. | | |
| 9,422,426 | B2 | | 8/2016 | Kwon et al. | | |
| 9,595,187 | B2 | | 3/2017 | Drovetskaya et al. | | |
| 10,058,489 | B2 | | 8/2018 | Drovetskaya et al. | | |
| 2009/0068755 | A1 | * | 3/2009 | Steeves | ................. | B82Y 15/00 |
| | | | | | | 436/172 |
| 2020/0123057 | A1 | | 4/2020 | An et al. | | |
| 2020/0216635 | A1 | | 7/2020 | Chu et al. | | |

FOREIGN PATENT DOCUMENTS

| CN | 104743602 A | 7/2015 |
| JP | 62-53739 A | 3/1987 |
| JP | 09-71727 A | 3/1997 |
| JP | 11-035787 A | 2/1999 |
| JP | 11-228844 A | 8/1999 |
| JP | 2001-010850 A | 1/2001 |
| JP | 2002-21774 A | 1/2002 |
| JP | 2002-068913 A | 3/2002 |
| JP | 2002-087842 A | 3/2002 |
| JP | 2003-212693 A | 7/2003 |
| JP | 2008-230895 A | 10/2008 |
| JP | 10-2011-0052425 A | 5/2011 |
| JP | 2011-137068 A | 7/2011 |
| KR | 10-1999-0028477 A | 4/1999 |
| KR | 10-0281656 | 11/2001 |
| KR | 10-815472 B1 | 3/2008 |
| KR | 10-2010-0076303 A | 7/2010 |
| KR | 10-2010-0087603 A | 8/2010 |
| KR | 10-2012-0077313 A | 7/2012 |
| KR | 10-2014-0086729 A | 7/2014 |
| KR | 10-2015-0017706 A | 2/2015 |
| KR | 10-2017-0014647 A | 2/2017 |
| KR | 10-2018-0071973 A | 6/2018 |
| RU | 2126775 C1 | 2/1999 |

(Continued)

OTHER PUBLICATIONS

Office Action in counterpart Japanese Application No. 2019-530736 dated Aug. 4, 2020, pp. 1-4.

(Continued)

Primary Examiner — Michael F Pepitone
(74) Attorney, Agent, or Firm — Additon, Pendleton & Witherspoon, P.A.

(57) ABSTRACT

A composition for artificial marble, of the present invention comprises: a binder resin; an inorganic filler excluding zinc oxide; and zinc oxide, wherein the zinc oxide has a size ratio (B/A), in which peak A is a 370 nm to 390 nm region and peak B is a 450 nm to 600 nm region, of approximately 0.01 to 1 during photoluminescence measurement, and has a BET surface area of approximately 10 m²/g or less.

12 Claims, No Drawings

(56) References Cited

FOREIGN PATENT DOCUMENTS

| WO | 97/01515 A1 | 1/1997 |
| WO | 2018/117603 A1 | 6/2018 |
| WO | 2019/021738 A1 | 2/2019 |
| WO | 2019/093636 A1 | 5/2019 |

OTHER PUBLICATIONS

Extended Search Report in counterpart European Application No. 17885334.7 dated Mar. 24, 2020, pp. 1-7.
Prasanna et al, "Insight into the Mechanism of Antibacterial Activity of ZnO Surface Defects Mediated Reactive Oxygen Species Even in the Dark", Langmuir, vol. 31, pp. 9155-9162, Jul. 29, 2015.
International Search Report in counterpart International Application No. PCT/KR2017/015028 dated Mar. 30, 2018, pp. 1-4.
International Search Report in commonly owned International Application No. PCT/KR2018/010015 dated Feb. 1, 2019, pp. 1-4.
Vijayaraghavan, Rajagopala etc., "Insight into the Mechanism of Antibacterial activity of ZnO: surface defects mediated reactive oxygen species even in the dark", American Chemical Society, 2015, vol. 31, No. 33, p. 9155-9162.
International Search Report in commonly owned International Application No. PCT/KR2018/006676 dated Oct. 30, 2018, pp. 1-4.

\* cited by examiner

COMPOSITION FOR ARTIFICIAL MARBLE

CROSS-REFERENCE TO RELATED APPLICATIONS

This application claims priority to and the benefit of International Application No. PCT/KR2017/015028, filed Dec. 19, 2017, which published as WO 2018/117603 on Jun. 28, 2018; Korean Patent Application No. 10-2016-0174840, filed in the Korean Intellectual Property Office on Dec. 20, 2016; and Korean Patent Application No. 10-2017-0174922, filed in the Korean Intellectual Property Office on Dec. 19, 2017, the entire disclosure of each of which is incorporated herein by reference.

TECHNICAL FIELD

The present invention relates to a composition for artificial marble. More particularly, the present invention relates to a composition for artificial marble which has good properties in terms of discoloration resistance and antibacterial effects, and a method of preparing the same.

BACKGROUND ART

Artificial marble has been widely used as an interior/exterior material for buildings, and use thereof is being extended to other applications such as a material for sink tops, basin tops, tops of various counters such as bank counters and sales counters, interior walls, and various interior sculptures.

Artificial marble used as an interior/exterior material for buildings is required to have good properties in terms of aesthetics and discoloration resistance. In addition, artificial marble used for various household goods and kitchen articles is required to further have antibacterial properties.

Conventionally, inorganic antibacterial agents containing a metal component such as silver or copper have been used as an antibacterial agent. However, such inorganic antibacterial agents need to be used in excess due to insufficient antibacterial activity as compared with organic antibacterial agents and are limited in use due to relatively high price, poor dispersibility during processing, metal ion-induced discoloration, and the like. On the other hand, organic antibacterial agents are relatively inexpensive and can provide good antibacterial effects even in small amounts. However, since organic antibacterial agents are sometimes toxic to humans, are only effective against certain bacteria, are likely to decompose and lose most antibacterial properties at high temperature required for processing into a resin, are likely to suffer from discoloration after processing, and have poor antibacterial durability due to elution problems, there is an extremely limited range of organic antimicrobial agents available as antibacterial resins.

Therefore, there is a need for a composition for artificial marble which has good properties in terms of discoloration resistance and antibacterial effects without deterioration in aesthetics.

The background technique of the present invention is disclosed in Korean Patent No. 815472.

DISCLOSURE

Technical Problem

The present invention is aimed at providing a composition for artificial marble which has good properties in terms of discoloration resistance and antibacterial effects without deterioration in aesthetics.

These and other objects of the present invention can be accomplished by the present invention described below.

Technical Solution

One aspect of the present invention relates to a composition for artificial marble. The composition includes: a binder resin; zinc oxide; and inorganic fillers excluding the zinc oxide, wherein the zinc oxide has a peak intensity ratio (B/A) of 0.01 to 1, where A indicates a peak in the wavelength range of 370 nm to 390 nm and B indicates a peak in the wavelength range of 450 nm to 600 nm in photoluminescence measurement, and a BET surface area of about 10 $m^2/g$ or less, as measured using a BET analyzer.

In some embodiments, the composition for artificial marble may include: 100 parts by weight of the binder resin; about 1 part by weight to about 10 parts by weight of the zinc oxide; and about 100 parts by weight to about 300 parts by weight of the inorganic fillers.

In some embodiments, the binder resin may include at least one of an acrylic resin and an unsaturated polyester resin.

In some embodiments, the binder resin may be a mixture of poly(meth)acrylate and a (meth)acrylate monomer.

In some embodiments, the inorganic fillers may include at least one of silica, alumina, calcium carbonate, calcium hydroxide, aluminum hydroxide, magnesium hydroxide, pearlite, vermiculite, smectite, and bentonite.

In some embodiments, the zinc oxide may have an average particle diameter of about 0.5 µm to about 3 µm.

In some embodiments, the zinc oxide may have a peak position degree (2θ) in the range of about 35° to about 37° and a crystallite size of about 1,000 Å to about 2,000 Å in X-ray diffraction (XRD) analysis, as calculated according to Equation 1.

$$\text{Crystallite size }(D) = \frac{K\lambda}{\beta\cos\theta}, \quad <\text{Equation 1}>$$

where K is a shape factor, λ is an X-ray wavelength, β is an FWHM value (degree) of an X-ray diffraction peak, and θ is a peak position degree.

In some embodiments, the inorganic fillers may have a greater average particle diameter than the zinc oxide.

In some embodiments, an average particle diameter ratio of the inorganic fillers to the zinc oxide may range from about 0.3:1 to about 200:1.

In some embodiments, the composition for artificial marble may further include at least one of marble chips, a crosslinking agent, a crosslinking accelerator, a curing agent, a curing accelerator, a polymerization initiator, an antifoaming agent, a dispersant, a coupling agent, and a pigment.

In some embodiments, the composition for artificial marble may have a color variation (ΔE) of about 0 to about 3, as calculated according to Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after weather resistance testing for 3,000 hours in accordance with SAE J 1960.

$$\text{Color variation }(\Delta E) = \sqrt{(\Delta L^*)^2 (\Delta a^*)^2 + (\Delta b^*)^2}, \quad <\text{Equation 2}>$$

where ΔL* is a difference ($L_1^* - L_0^*$) between L* values before and after temperature/humidity testing, Δa* is a difference ($a_1^* - a_0^*$) between a* values before and after temperature/humidity testing, and Δb* is a difference ($b_1^* - b_0^*$) between b* values before and after temperature/humidity testing.

In some embodiments, the composition for artificial marble may have an antibacterial activity against *Staphylococcus aureus* of about 2.0 to about 7.0 and an antibacterial activity against *Escherichia coli* of about 2.0 to about 6.5, as measured on 5 cm×5 cm specimens inoculated with *Staphylococcus aureus* and *Escherichia coli*, respectively, in accordance with JIS Z 2801 and calculated according to Equation 3.

$$\text{Antibacterial activity} = \log(M1/M2), \qquad \text{<Equation 3>}$$

where M1 is the number of bacteria as measured on a blank specimen after incubation under conditions of 35° C. and 90% RH for 24 hours and M2 is the number of bacteria as measured on a specimen of the artificial marble after incubation under conditions of 35° C. and 90% RH for 24 hours.

Another aspect of the present invention relates to artificial marble. The artificial marble is formed of the composition for artificial marble set forth above.

Advantageous Effects

The present invention provides a composition for artificial marble which has good properties in terms of discoloration resistance and antibacterial effects without deterioration in aesthetics.

BEST MODE (A) Binder Resin

A binder resin according to the present invention may include at least one of an acrylic resin and an unsaturated polyester resin.

The binder resin may be used in the form of a resin syrup in which a polymer is dissolved in a monomer.

In some embodiments, the binder resin may be a mixture of poly(meth)acrylate and a (meth)acrylate monomer. Specifically, the binder resin may include about 65 wt % to about 99 wt % of the (meth)acrylate monomer and about 1 wt % to about 35 wt % of the poly(meth)acrylate. For example, the (meth)acrylate monomer may be present in an amount of 65 wt %, 65 wt %, 70 wt %, 75 wt %, 80 wt %, 85 wt %, 90 wt %, 95 wt %, or 99 wt % in the binder resin and the poly(meth)acrylate may be present in an amount of 1 wt %, 5 wt %, 10 wt %, 15 wt %, 20 wt %, 25 wt %, 30 wt %, or 35 wt % in the binder resin.

Examples of the (meth)acrylate monomer may include methyl (meth)acrylate, ethyl (meth)acrylate, isopropyl (meth)acrylate, butyl (meth)acrylate, 2-ethylhexyl (meth) acrylate, benzyl (meth)acrylate, and glycidyl (meth)acrylate. These may be used alone or as a mixture thereof.

The unsaturated polyester resin may include an unsaturated polyester resin prepared by condensation of a saturated or unsaturated dibasic acid and a polyhydric alcohol, without being limited thereto. Examples of the saturated or unsaturated dibasic acid may include maleic anhydride, citraconic acid, fumaric acid, itaconic acid, phthalic acid, phthalic anhydride, isophthalic acid, terephthalic acid, succinic acid, adipic acid, sebacic acid, or tetrahydrophthalic acid and examples of the polyhydric alcohol may include ethylene glycol, diethylene glycol, triethylene glycol, propylene glycol, dipropylene glycol, tripropylene glycol, polypropylene glycol, 1,3-butylene glycol, hydrogenated bisphenol A, trimethylolpropane monoallyl ether, neopentyl glycol, 2,2,4-trimethyl-1,3-pentadiol and/or glycerin. In addition, the unsaturated polyester resin may be prepared further using a monobasic acid such as acrylic acid, propionic acid, or benzoic acid or a polybasic acid such as trimellitic acid or tetracarboxylic acid of benzol, as needed.

(B) Inorganic Fillers

Inorganic fillers according to the present invention may include silica, alumina, calcium carbonate, calcium hydroxide, aluminum hydroxide, magnesium hydroxide, pearlite, vermiculite, smectite, and bentonite, and zinc oxide is excluded from the inorganic fillers. Thereamong, aluminum hydroxide is preferred to provide a transparent and beautiful appearance.

In some embodiments, the inorganic fillers may have an average particle diameter of about 1 μm to about 100 μm, specifically about 3 μm to about 75 μm, for example, 3 μm, 5 μm, 10 μm, 15 μm, 20 μm, 25 μm, 30 μm, 35 μm, 40 μm, 45 μm, 50 μm, 55 μm, 60 μm, 65 μm, 70 μm, or 75 μm. Within this range, artificial marble formed of the composition for artificial marble according to the present invention can have good properties in terms of appearance, texture, and surface strength.

The inorganic fillers may be present in an amount of about 100 parts by weight to about 300 parts by weight, specifically about 150 parts by weight to about 200 parts by weight, for example, 150 parts by weight, 155 parts by weight, 160 parts by weight, 165 parts by weight, 170 parts by weight, 175 parts by weight, 180 parts by weight, 185 parts by weight, 190 parts by weight, 195 parts by weight, or 200 parts by weight, relative to 100 parts by weight of the binder resin. Within this range, the composition for artificial marble can have good processability while securing a beautiful appearance.

(C) Zinc Oxide

Zinc oxide according to the present invention may have a peak intensity ratio (B/A) of about 0.01 to about 1, specifically about 0.01 to about 0.5, more specifically about 0.1 to about 0.3, for example, 0.01, 0.05, 0.1, 0.15 0.2, 0.25, 0.3, 0.35, 0.4, 0.45, 0.5, 0.6, 0.65, 0.7, 0.75, 0.8, 0.85, 0.9, 0.95, or 1, where A indicates a peak in the wavelength range of 370 nm to 390 nm and B indicates a peak in the wavelength range of 450 nm to 600 nm in photoluminescence measurement, and a BET surface area of about 10 m$^2$/g or less, specifically about 1 m$^2$/g to about 10 m$^2$/g, more specifically about 1 m$^2$/g to about 7 m$^2$/g, for example, 1 m$^2$/g, 2 m$^2$/g, 3 m$^2$/g, 4 m$^2$/g, 5 m$^2$/g, 6 m$^2$/g, 7 m$^2$/g, 8 m$^2$/g, 9 m$^2$/g or 10 m$^2$/g, as measured by a nitrogen gas adsorption method using a BET analyzer.

If the peak intensity ratio (B/A) of the zinc oxide is less than about 0.01, the composition for artificial marble can have poor antibacterial properties, whereas, if the peak intensity ratio (B/A) of the zinc oxide exceeds about 1, the composition for artificial marble cannot secure discoloration resistance. If the BET surface area of the zinc oxide exceeds 10 m$^2$/g, the composition for artificial marble cannot secure the desired level of discoloration resistance and appearance.

The zinc oxide may have an average particle diameter of about 0.5 μm to about 3 μm, specifically about 1 μm to about 3 μm, for example, 0.5 μm, 0.6 μm, 0.7 μm, 0.8 μm, 0.9 μm, 1 μm, 1.1 μm, 1.2 μm, 1.3 μm, 1.4 μm, 1.5 μm, 1.6 μm, 1.7 μm, 1.8 μm, 1.9 μm, 2 μm, 2.1 μm, 2.2 μm, 2.3 μm, 2.4 μm, 2.5 μm, 2.6 μm, 2.7 μm, 2.8 μm, 2.9 μm, or 3 μm, as measured using a particle size analyzer (LS 13 320, Beckman Coulter Co., Ltd.). Within this range, the composition for artificial marble can provide good appearance.

In one embodiment, the inorganic fillers may have a greater average particle diameter than the zinc oxide.

In another embodiment, an average particle diameter ratio of the inorganic fillers to the zinc oxide may range from about 0.3:1 to about 200:1, for example, about 1:1 to about 100:1, about 2:1 to about 100:1, about 5:1 to about 100:1, or about 5:1 to about 30:1. Within this range, it is possible to maintain or improve antibacterial properties of artificial marble formed of the composition without deterioration in other properties of the artificial marble.

The zinc oxide may have a peak position degree (2θ) in the range of about 35° to about 37° and a crystallite size of about 1,000 Å to about 2,000 Å, specifically about 1,200 Å to 1,800 Å, for example, 1,100 Å, 1,200 Å, 1,300 Å, 1,400 Å, 1,500 Å, 1,600 Å, 1,700 Å, 1,800 Å, 1,900 Å, or 2,000 Å, in X-ray diffraction (XRD) analysis, as calculated by Equation 1.

$$\text{Crystallite size }(D) = \frac{K\lambda}{\beta\cos\theta}, \qquad <\text{Equation 1}>$$

where K is a shape factor, λ is an X-ray wavelength, β is an FWHM value (degree) of an X-ray diffraction peak, and θ is a peak position degree.

The zinc oxide may have a purity of about 99% or more. Within this range, artificial marble formed of the composition can have further improved properties in terms of initial color, weather resistance, and antibacterial effects.

In some embodiments, the zinc oxide may be prepared by melting metallic zinc in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., heating the reactor to about 700° C. to about 800° C. for about 30 minutes to about 150 minutes while injecting nitrogen/hydrogen gas into the reactor, as needed, and cooling the reactor to room temperature (about 20° C. to about 30° C.).

In some embodiments, the zinc oxide may be present in an amount of about 1 part by weight to about 10 parts by weight, specifically, about 2 parts by weight to about 7 parts by weight, for example, 1 part by weight, 2 parts by weight, 3 parts by weight, 4 parts by weight, 5 parts by weight, 6 parts by weight, 7 parts by weight, 8 parts by weight, 9 parts by weight, or 10 parts by weight, relative to 100 parts by weight of the binder resin. Within this range, artificial marble formed of the composition can have good properties in terms of weather resistance and antibacterial effects.

In one embodiment, the composition for artificial marble may further include at least one additive of marble chips, a crosslinking agent, a crosslinking accelerator, a curing agent, a curing accelerator, a polymerization initiator, an antifoaming agent, a dispersant, a coupling agent, and a pigment.

In addition, the additive may further include any typical additive used in artificial marble, without limitation.

The marble chips are formed by pulverizing artificial marble. For example, the marble chips may be obtained by mixing 100 parts by weight of an acrylic resin syrup with about 120 parts by weight to about 200 parts by weight of inorganic fillers, about 0.1 parts by weight to about 10 parts by weight of a crosslinking agent, and about 0.1 parts by weight to about 10 parts by weight of a polymerization initiator, curing the mixture, pulverizing the cured mixture, and sieving into about 0.1 mm to about 5 mm size fractions.

The marble chips may be present in an amount of about 0 parts by weight about 150 parts by weight, preferably about 0 parts by weight to about 70 parts by weight, relative to 100 parts by weight of the binder resin.

The crosslinking agent may include any double bond-containing compound crosslinkable with the binder resin, without limitation. For example, the crosslinking agent may include ethylene glycol di(meth)acrylate (EDMA), diethylene glycol di(meth)acrylate (2EDMA), triethylene glycol di(meth)acrylate (3EDMA), tetraethylene glycol di(meth)acrylate (4EDMA), trimethylolpropane tri(meth)acrylate (TMPMA), 1,6-hexanediol di(meth)acrylate, polybutylene glycol di(meth)acrylate, neopentyl glycol di(meth)acrylate, and mixtures thereof. The crosslinking agent may be present in an amount of about 0.1 parts by weight to about 10 parts by weight, for example, 0.1 parts by weight, 0.5 parts by weight, 1 part by weight, 2 parts by weight, 3 parts by weight, 4 parts by weight, 5 parts by weight, 6 parts by weight, 7 parts by weight, 8 parts by weight, 9 parts by weight, or 10 parts by weight, relative to 100 parts by weight of the binder resin.

The curing agent may include any typical curing agent used in artificial marble compositions, without limitation. The curing agent may be present in an amount of about 0.1 parts by weight to about 5.0 parts by weight, for example, 0.1 parts by weight, 0.5 parts by weight, 1 part by weight, 2 parts by weight, 3 parts by weight, 4 parts by weight, or 5 parts by weight, relative to 100 parts by weight of the binder resin.

The polymerization initiator serves to promote polymerization and curing of the resin composition in manufacture of artificial marble. Examples of the polymerization initiator may include: diacyl peroxides such as benzoyl peroxide and dicumyl peroxide; hydroperoxides such as butyl hydroperoxide, t-butyl hydroperoxide, and cumyl hydroperoxide; t-butyl peroxymaleic acid; t-butyl peroxymaleate; t-butyl hydroperoxybutyrate; acetyl peroxide; lauroyl peroxide; azobisisobutyronitrile; azobisdimethylvaleronitrile; t-butyl peroxyethylhexanoate; t-butyl peroxyneodecanoate; and t-amyl peroxy-2-ethylhexanoate, without being limited thereto. The polymerization initiator may be present in an amount of about 0.1 parts by weight to about 5.0 parts by weight, for example, 0.1 parts by weight, 0.5 parts by weight, 1 part by weight, 2 parts by weight, 3 parts by weight, 4 parts by weight, or 5 parts by weight, relative to 100 parts by weight of the binder resin.

The coupling agent helps to promote adhesion between the inorganic fillers and the binder resin and is well known to a person having ordinary skill in the art. Preferably, the coupling agent includes a silane coupling agent such as 3-(trimethoxysilyl)propyl methacrylate, vinyltrimethoxysilane, or vinyltriethoxysilane. The coupling agent may be present in an amount of about 0.1 parts by weight to about 1.0 part by weight, for example, 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, or 1 part by weight, relative to 100 parts by weight of the binder resin.

Examples of the pigment may include an inorganic pigment, an organic pigment, and a dye. Preferably, the pigment includes any typical pigment used in the art, for example, a reddish brown pigment such as iron oxide, a yellow pigment such as iron hydroxide, a green pigment such as chromium oxide, a navy blue pigment such as sodium aluminosilicate, a white pigment such as titanium oxide, and a black pigment such as carbon black. The pigment may be present in an amount of about 0.0001 parts by weight to about 5.0 parts by weight, for example, 0.0001 parts by weight, 0.001 parts by weight, 0.01 parts by weight, 0.1 parts by weight, 0.5 parts by weight, 1 part by weight, 1.5 parts by weight, 2 parts by weight, 2.5 parts by weight, 3 parts by weight, 3.5 parts by weight, 4 parts by weight, 4.5 parts by weight, or 5 parts by weight, relative to 100 parts by weight of the binder resin.

In some embodiments, the composition for artificial marble may have a color variation (ΔE) of about 0 to about 3, for example, 0, 1, 2, or 3, as calculated according to Equation 2 based on initial color values ($L_0^*$, $a_0^*$, $b_0^*$) measured on an injection-molded specimen having a size of 50 mm×90 mm×3 mm using a colorimeter and color values ($L_1^*$, $a_1^*$, $b_1^*$) of the specimen measured using the colorimeter after weather resistance testing for 3,000 hours in accordance with SAE J 1960.

$$\text{Color variation } (\Delta E) = \sqrt{(\Delta L^*)^2 + (\Delta a^*)^2 + (\Delta b^*)^2}, \quad \text{<Equation 2>}$$

where ΔL* is a difference ($L_1^* - L_0^*$) between L* values before and after temperature/humidity testing, Δa* is a difference ($a_1^* - a_0^*$) between a* values before and after temperature/humidity testing, and Δb* is a difference ($b_1^* - b_0^*$) between b* values before and after temperature/humidity testing.

In some embodiments, the composition for artificial marble may have an antibacterial activity against *Staphylococcus aureus* of about 2.0 to about 7.0, for example, 2, 2.5, 3, 3.5, 4, 4.5, 5, 5.5, 6, 6.5, or 7, and an antibacterial activity against *Escherichia coli* of about 2.0 to about 6.5, for example, 2, 2.5, 3, 3.5, 4, 4.5, 5, 5.5, 6, or 6.5, as measured on 5 cm×5 cm specimens inoculated with *Staphylococcus aureus* and *Escherichia coli*, respectively, in accordance with JIS Z 2801 and calculated according to Equation 3.

$$\text{Antibacterial activity} = \log(M1/M2) \quad \text{<Equation 3>}$$

where M1 is the number of bacteria as measured on a blank specimen after incubation under conditions of 35° C. and 90% RH for 24 hours and M2 is the number of bacteria as measured on a specimen of the artificial marble after incubation under conditions of 35° C. and 90% RH for 24 hours.

In accordance with another aspect of the present invention, artificial marble may be manufactured by curing the composition for artificial marble set forth above. Curing of the composition may be performed at a temperature of about 25° C. to about 180° C. Here, an amine or sulfonic acid compound or a saponified salt of copper, cobalt, potassium, calcium, zirconium or zinc may be used along with the curing agent to control curing of the composition.

In some embodiments, the composition for artificial marble may be subjected to defoaming before the curing process. In defoaming of the composition, a defoamer may be used. In addition, defoaming of the composition may be conducted under a vacuum of about 760 mmHg.

Next, the present invention will be described in more detail with reference to some examples. It should be understood that these examples are provided for illustration only and are not to be in any way construed as limiting the present invention.

In addition, description of details apparent to those skilled in the art will be omitted for clarity.

EXAMPLE (A) Binder Resin
A syrup prepared by dissolving 30 wt % of poly(methyl methacrylate) (PMMA) in 70 wt % of methyl methacrylate (B) Inorganic Fillers
Aluminum hydroxide having an average particle diameter of 10 μm
(C) Zinc Oxide
Zinc oxides listed in Table 1

TABLE 1

|  | (C1) | (C2) | (C3) | (C4) | (C5) |
|---|---|---|---|---|---|
| Average particle diameter (μm) | 1.2 | 1.0 | 1.1 | 1.0 | 1.0 |
| BET surface area (m²/g) | 4 | 6 | 15 | 11 | 4 |
| Purity (%) | 99 | 99 | 97 | 99 | 99 |
| PL peak intensity ratio (B/A) | 0.28 | 0.5 | 9.8 | 0.3 | 1.5 |
| Crystallite size (Å) | 1417 | 1229 | 503 | 1500 | 1600 |

Measurement of Properties of Zinc Oxide
(1) Average particle diameter (unit: μm): Average particle diameter (volume average) was measured using a particle size analyzer (Laser Diffraction Particle Size Analyzer LS I3 320, Beckman Coulter Co., Ltd.).
(2) BET surface area (unit: m²/g): BET surface area was measured by a nitrogen gas adsorption method using a BET analyzer (Surface Area and Porosity Analyzer ASAP 2020, Micromeritics Co., Ltd.).
(3) Purity (unit: %): Purity was measured by thermogravimetric analysis (TGA) based on the weight of remaining material at 800° C.
(4) PL peak intensity ratio (B/A): Spectrum emitted upon irradiation of a specimen using a He—Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak A in the wavelength range of 370 nm to 390 nm to peak B in the wavelength range of 450 nm to 600 nm was measured. Here, an injection molded specimen was irradiated with laser beams without separate treatment upon PL analysis, and zinc oxide powder was compressed in a pelletizer having a diameter of 6 mm to prepare a flat specimen.
(5) Crystallite size (unit: Å): Crystallite size was measured using a high-resolution X-ray diffractometer (PRO-MRD, X'pert Inc.) at a peak position degree (2θ) in the range of 35° to 37° and calculated by Scherrer's Equation (Equation 1) with reference to a measured FWHM value (full width at half maximum of a diffraction peak). Here, both a powder form and an injection molded specimen could be measured. For more accurate analysis, the injection molded specimen was subjected to heat treatment in air at 600° C. for 2 hours to remove a polymer resin therefrom before XRD analysis.

$$\text{Crystallite size }(D) = \frac{K\lambda}{\beta \cos\theta} \quad \text{< Equation 1 >}$$

where K is a shape factor, λ is an X-ray wavelength, β is an FWHM value (degree) of an X-ray diffraction peak, and θ is a peak position degree.

Examples 1 and 2 and Comparative Examples 1 to 4

Fabrication of Artificial Marble

The aforementioned components were mixed in amounts listed in Tables 2 and 3, followed by addition of trimethylolpropane trimethacrylate, normal dodecyl mercaptan, an antifoaming agent, a dispersant, and a polymerization initiator to the mixture to prepare a composition for artificial marble, which, in turn, was subjected to stirring, vacuum defoaming, and curing at 80° C., thereby obtaining artificial marble.

Property Evaluation (1) Weather resistance (color variation ($\Delta E$)): For determination of color variation, initial color values $L_0^*$, $a_0^*$ and $b_0^*$ were measured on an injection molded specimen having a size of 50 mm×90 mm×3 mm using a colorimeter (CM-3700A, KONICA MINOLTA) and was then subjected to weather resistance testing for 3,000 hours in accordance with SAE J 1960, followed by measurement of color values $L_1^*$, $a_1^*$ and $b_1^*$ of the specimen using the colorimeter. Thereafter, a color variation ($\Delta E$) was calculated according to Equation 2.

$$\text{Color variation } (\Delta E) = \sqrt{(\Delta L^*)^2 + (\Delta a^*)^2 + (\Delta b^*)^2}, \quad \text{<Equation 2>}$$

where $\Delta L^*$ is a difference ($L_1^* - L_0^*$) between $L^*$ values before and after temperature/humidity testing, $\Delta a^*$ is a difference ($a_1^* - a_0^*$) between $a^*$ values before and after temperature/humidity testing, and $\Delta b^*$ is a difference ($b_1^* - b_0^*$) between $b^*$ values before and after temperature/humidity testing.

(2) Antibacterial activity: Antibacterial activity was measured on 5 cm×5 cm specimens inoculated with *Staphylococcus aureus* and *Escherichia coli*, respectively, in accordance with JIS Z 2801 and calculated according to Equation 3:

$$\text{Antibacterial activity} = \log(M1/M2), \quad \text{<Equation 3>}$$

where M1 is the number of bacteria as measured on a blank specimen after incubation under conditions of 35° C. and 90% RH for 24 hours and M2 is the number of bacteria as measured on a specimen of artificial marble after incubation under conditions of 35° C. and 90% RH for 24 hours.

TABLE 2

|  |  | Example 1 | Example 2 |
|---|---|---|---|
| (A) Binder resin | | 100 | 100 |
| (B) Inorganic fillers | | 150 | 150 |
| (C) Zinc oxide | (C1) | 5 | — |
|  | (C2) | — | 5 |
| Antibacterial activity | *Staphylococcus aureus* | 4.6 | 4.6 |
|  | *Escherichia coli* | 6.3 | 6.3 |
| Color variation ($\Delta E$) | | 0.8 | 1.1 |

From the results shown above, it can be seen that the composition for artificial marble of Comparative Example 1 had an antibacterial activity against *Escherichia coli* of 2 or less, i.e., exhibited poor antibacterial effects, and suffered from discoloration. In addition, the compositions for artificial marble of Comparative Examples 2 to 4 using zinc oxide having a peak intensity ratio (B/A) less than about 0.01 or greater than about 1, where A indicates a peak in the wavelength range of 370 nm to 390 nm and B indicates a peak in the wavelength range of 450 nm to 600 nm, or having a BET surface area greater than about 10 m²/g had poor discoloration resistance despite exhibiting antibacterial effects.

It should be understood that various modifications, changes, alterations, and equivalent embodiments can be made by those skilled in the art without departing from the spirit and scope of the invention.

The invention claimed is:

1. A composition for artificial marble, comprising:
   a binder resin;
   inorganic fillers excluding zinc oxide; and
   zinc oxide;
   wherein the zinc oxide has a peak intensity ratio (B/A) of about 0.01 to about 1, where A indicates a peak in the wavelength range of 370 nm to 390 nm and B indicates a peak in the wavelength range of 450 nm to 600 nm in photoluminescence measurement, a BET surface area of about 10 m²/g or less, as measured using a BET analyzer, a peak position degree (2θ) in the range of about 35° to about 37°, and a crystallite size of about 1,000 Å to about 2,000 Å in X-ray diffraction (XRD) analysis, as calculated according to Equation 1:

$$\text{Crystallite size } (D) = \frac{K\lambda}{\beta \cos\theta}, \quad \text{[Equation 1]}$$

where K is a shape factor, λ is an X-ray wavelength, β is an FWHM value (degree) of an X-ray diffraction peak, and θ is a peak position degree.

2. The composition for artificial marble according to claim 1, comprising:
   100 parts by weight of the binder resin;
   about 100 parts by weight to about 300 parts by weight of the inorganic fillers excluding zinc oxide; and
   about 1 part by weight to about 10 parts by weight of the zinc oxide.

3. The composition for artificial marble according to claim 1, wherein the binder resin comprises an acrylic resin and/or an unsaturated polyester resin.

TABLE 3

|  |  | Comparative Example 1 | Comparative Example 2 | Comparative Example 3 | Comparative Example 4 |
|---|---|---|---|---|---|
| (A) Binder resin | | 100 | 100 | 100 | 100 |
| (B) Inorganic fillers | | 150 | 150 | 150 | 150 |
| (C) Zinc oxide | (C1) | — | — | — | — |
|  | (C2) | — | — | — | — |
|  | (C3) | — | 5 | — | — |
|  | (C4) | — | — | 5 | — |
|  | (C5) | — | — | — | 5 |
| Antibacterial activity | *Staphylococcus aureus* | 2.1 | 4.6 | 4.2 | 4.5 |
|  | *Escherichia coli* | 0 | 6.0 | 5.8 | 6.0 |
| Color variation ($\Delta E$) | | 8.4 | 7.6 | 9.2 | 8.7 |

4. The composition for artificial marble according to claim 1, wherein the binder resin is a mixture of poly(meth) acrylate and a (meth)acrylate monomer.

5. The composition for artificial marble according to claim 1, wherein the inorganic fillers comprise silica, alumina, calcium carbonate, calcium hydroxide, aluminum hydroxide, magnesium hydroxide, pearlite, vermiculite, smectite, and/or bentonite.

6. The composition for artificial marble according to claim 1, wherein the zinc oxide has an average particle diameter of about 0.5 μm to about 3 μm.

7. The composition for artificial marble according to claim 1, wherein the inorganic fillers have a greater average particle diameter than the zinc oxide.

8. The composition for artificial marble according to claim 1, wherein an average particle diameter ratio of the inorganic fillers to the zinc oxide ranges from about 0.3:1 to about 200:1.

9. The composition for artificial marble according to claim 1, further comprising:
marble chips, a crosslinking agent, a crosslinking accelerator, a curing agent, a curing accelerator, a polymerization initiator, an antifoaming agent, a dispersant, a coupling agent, and/or a pigment.

10. The composition for artificial marble according to claim 1, wherein the composition has a color variation (ΔE) of about 0 to about 3, as calculated according to Equation 2 based on initial color values ($L_0^*$, $a_0^*$, $b_0^*$) measured on an injection-molded specimen having a size of 50 mm× 90 mm× 3 mm using a colorimeter and color values ($L_1^*$, $a_1^*$, $b_1^*$) of the specimen measured using the colorimeter after weather resistance testing for 3,000 hours in accordance with SAE J 1960:

$$\text{Color variation } (\Delta E) = \sqrt{(\Delta L^*)^2 (\Delta a^*)^2 + (\Delta b^*)^2}, \quad \text{<Equation 2>}$$

where ΔL* is a difference ($L_1^* - L_0^*$) between L* values before and after temperature/humidity testing, Δa* is a difference ($a_1^* - a_0^*$) between a* values before and after temperature/humidity testing, and Δb* is a difference ($b_1^* - b_0^*$) between b* values before and after temperature/humidity testing.

11. The composition for artificial marble according to claim 1, wherein the composition has an antibacterial activity against *Staphylococcus aureus* of about 2.0 to about 7.0 and an antibacterial activity against *Escherichia coli* of about 2.0 to about 6.5, as measured on 5 cm×5 cm specimens inoculated with *Staphylococcus aureus* and *Escherichia coli*, respectively, in accordance with JIS Z 2801 and calculated according to Equation 3:

$$\text{Antibacterial activity} = \log(M1/M2), \quad \text{[Equation 3]}$$

where M1 is the number of bacteria as measured on a blank specimen after incubation under conditions of 35° C. and 90% RH for 24 hours and M2 is the number of bacteria as measured on a specimen of the artificial marble after incubation under conditions of 35° C. and 90% RH for 24 hours.

12. Artificial marble formed of the composition for artificial marble according to claim 1.

* * * * *